Jan. 18, 1938.  E. G. GARTIN  2,105,492
LUBRICATING DEVICE
Filed Dec. 3, 1934

Inventor:
Elmer G. Gartin
by Luis A. Mexom
Atty.

Patented Jan. 18, 1938

2,105,492

UNITED STATES PATENT OFFICE 2,105,492

LUBRICATING DEVICE

Elmer G. Gartin, Claremont, N. H., assignor to Sullivan Machinery Corporation, a corporation of Massachusetts Application December 3, 1934, Serial No. 755,732

19 Claims. (Cl. 184—55)

My invention relates to lubricating devices, and more particularly to lubricating devices for use in air lines leading to air operated tools and the like.

In the lubrication of rock drilling motors, air operated hoists, and the like, it is desirable to provide for the positive supply of lubricant at the appropriate rate through the air line, and where a lubricator is to be used for this purpose it is desirable also to insure against the emptying of the lubricator, irrespective of whether or not the operator remembers to take the necessary steps to preclude this result, following interruption of air flow. Various lubricators have been provided in which the air flows through a passage extending within the walls of the lubricant-containing chamber, but such lubricators are commonly of the type in which lubricant flow is effected through a Pitot tube effect, and positive feed is not attained.

It is an object of my invention to provide an improved lubricating device. It is another object of my invention to provide an improved lubricating device having improved means for providing a positive feed of lubricant while at the same time precluding lubricant flow during times when the devices to be lubricated are not operating. It is another object of my invention to provide an improved lubricating device in which the pressure of the motive fluid to be supplied to the tools to be lubricated operates to provide a constant pressure upon the lubricant operative to effect feed thereof, but in which there is provided automatic means, controlled by the flow of the air to the implement to be operated, so that upon the cessation of air flow, lubricant discharge is automatically interrupted. Other objects and advantages of the invention will hereinafter more fully appear.

In the accompanying drawing, in which one form which my invention may assume in practice has been shown for purposes of illustration,—

Figure 1:
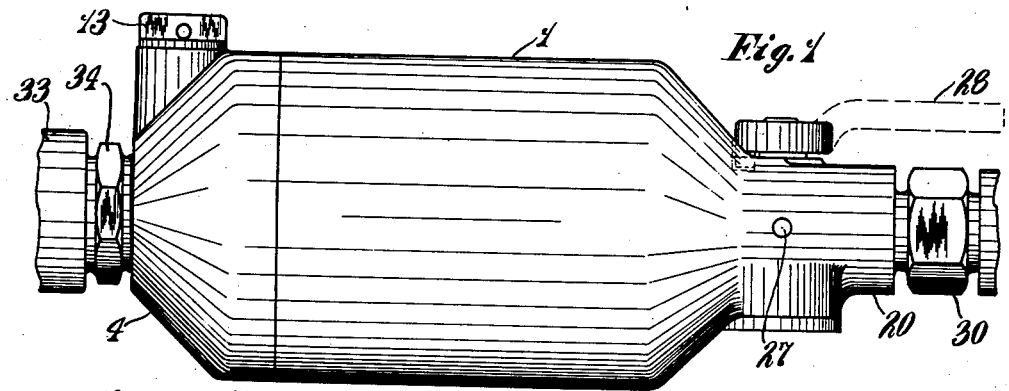
Fig. 1 is a side elevation of a lubricator constructed in accordance with such illustrative embodiment.
Figure 2:
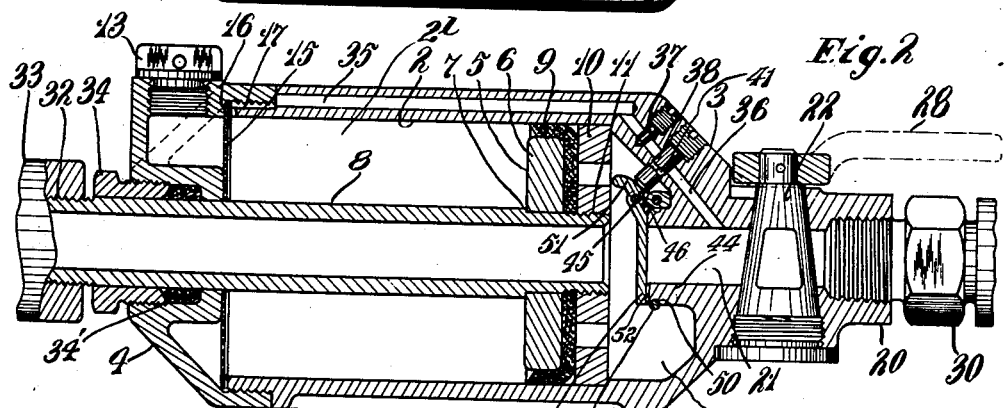
Fig. 2 is a central longitudinal section through the lubricator shown in Fig. 1.
Figures 5, 6:
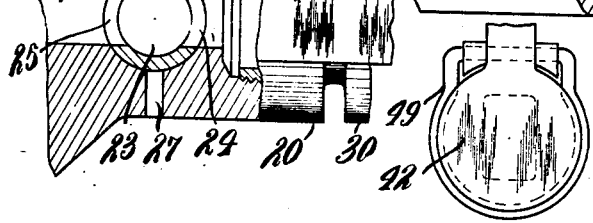
Fig. 5 is a horizontal sectional view on a plane corresponding to the line 5—5 of Fig. 3.
Fig. 6 is a detail face view of the flow-controlled device for controlling the lubricant flow.

Referring to the drawing, it will be noted that a casing 1 has a cylindrical bore 2 therein, and at one end is closed by an integral head 3 and at the other end by a detachable head 4. Within the bore 2 is reciprocable a piston, generally designated 5, consisting of an abutment member 6 seating against a shoulder 7 on a hollow piston rod 8, a cup packing 9, and a follower member 10 threadedly engaged at 11 with the extremity of the piston rod and clamping the cup leather 9 in the position shown; the cup leather being so arranged as to preclude passage of lubricant, which is stored in the bore 2 to the left of the piston 5 in Fig. 2, in the chamber of variable volume, 2', past the piston, into the air chamber 2ª at the right end of the bore 2. The head 4 is provided with a filler plug 13 which may be removed to permit filling of the chamber 2' with lubricant, and a suitable screen 15 is provided to strain the oil prior to its entrance into the chamber 2'. The screen 15 is clamped between a shoulder 16 on the head 4 and a reduced end 17 upon the casing member 1. The integral head 3 of the casing member 1 is provided with a reduced portion 20 and is traversed by a passage 21 which is controllable by a valve 22 which is rotatably mounted at right angles to the passage 21. The valve 22 is hollow, as shown at 23, and has diametrically opposite openings 24 and 25 therein which, when alined with the axis of the passage 21 as shown in Fig. 5, permit free flow of air into the space 2ª. The valve is also provided with a small passage 26 at right angles to the central line passing through the passages 24 and 25, and the casing head 3 is provided with a passage 27 of small diameter and at right angles to the passage 21, into communication with which the passage 25 may be brought when desired. A handle 28 is provided to control the position of the valve 22, and herein extends in line with the major dimension of the casing 1 when flow of fluid is to be permitted, and at right angles to the major dimension of the casing when flow is to be interrupted. At 29 a suitable terminal connection 30 of a line leading from a source of operating fluid under pressure is connected to the lubricator casing, and the piston rod 8 is threaded at 32 for connection with a line 33 leading to a tool to be lubricated. A gland 34 with packing 34' is provided for the purpose of preventing leakage along the outside of the piston rod 8. A passage 35 communicating with the chamber 2' within the bore 2 just to the inside of the strainer 15, extends longitudinally of the casing to a point near the integrally closed end of the latter, and then obliquely, as at 36, into communication with the passage 21. The obliquely extending portion 36 is controlled by an adjustable needle valve 37 which regulates the maximum quantity of lubricant which may pass through the passage, and by an automatic flow controlled valve mechanism, generally designated 38, which is adapted to interrupt passage of lubricant through the passage 35, 36 when no air is flowing through the passage 21. The mechanism 38 includes a reciprocable valve member 39 normally pressed by a spring 40 into flow-interrupting position, but having a peripheral groove 41 through which, when the valve spring has been compressed, flow may take place from one side of the valve to the other. To actuate the valve 39 to open position, I have provided operating means including a pivoted flap 42 opposite the end of the passage 21, the same being adapted to seat upon the surface 43 formed on an inwardly projecting boss 44 extending inwardly from the inner surface of the head 3. The member 42 is pivotally supported, as at 45, upon arms 46 carried by a support member 47 held in position by a stout spring clip 49 suitably engaged in a groove 50 in the boss 44. The flap 42 has a cam portion 51 cooperating to move the valve 39 to flow-permitting position on motive fluid flow through the passage 21. Any suitable clearance, for example a slit at 52, serves to preclude complete shutting off of communication between space 2ª and passage 21 when the flap 42 is in the position of Fig. 2.

Figures 3, 4:
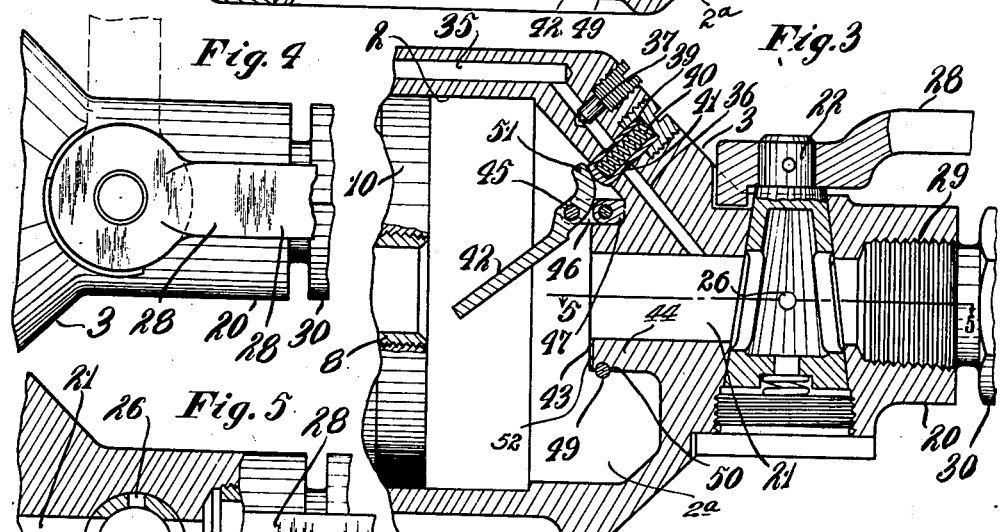
Fig. 3 is a fragmentary sectional view, on an enlarged scale, on the same plane as the section of Fig. 2, showing the main air flow controlling valve associated with the lubricator, in a different position.
Fig. 4 is a fragmentary top view of the lubricator with the parts in the position shown in Fig. 3.

The mode of operation of the device will be readily understood from the foregoing description. It will be understood that the rock drilling motor or other user of lubricant-laden motive fluid will normally be provided with a throttle valve which will be closed when it is desired to shut down its operation. With the valve 22 in the position shown in Fig. 3, opening of the throttle valve of the motor to be supplied with lubricant and operating fluid will be followed by flow through the passage 21 and through the bore of the hollow piston rod 8. This flow will be possible in adequate volume only by virtue of movement of the member 42 from the position shown in Fig. 2 towards that shown in Fig. 3, and as a result the cam 51 will be swung arcuately to unseat the valve 39. Accordingly, the groove 41 will be brought into such position with respect to the passage 36 that lubricant may flow from the chamber 2' through the passage 35 and passage 36 at the rate permitted by the adjustment of the needle valve 37, and enter the passage 21, where it will be picked up by the rapid flow of air and carried into the hollow piston rod and on to the tool, which is then in operation. It will be undertood that the valve 39 does not need to be moved to the position shown in Fig. 3 for lubricant to pass in the full quantity permitted by adjustment of the valve 37 through passage 36; and that the lubricant reservoir will not be filled to such an extent as to prevent the cam 51 from effecting the needed movement of the valve 39 upon the turning on of air through passage 21. Lubricant will be positively supplied at a pressure higher than the air pressure in the passage 21 by reason of the fact that the piston presents an unbalanced area equal at least to the cross sectional area of the wall of the hollow piston rod 8. The lubricant will therefore be stored at a pressure higher than line pressure, with the result that there will be a positive and assured flow of lubricant whenever air is passing through the passage 21. Whenever the flow is interrupted by the closing of the throttle valve at the device which has been previously supplied with operating fluid through the lubricator, the force holding the member 42 in the position shown in Fig. 3 will be discontinued and the spring 40 will return the member 42 to the position shown in Fig. 2, and the valve 39 will prevent further passage of lubricant into the passage 21. If desired, the throttle valve 22 may be turned to a position 90° counter-clockwise from that shown in Fig. 5 and vent all pressure from the space 2ª, such an arrangement of the valve 22 being necessary when it is desired to refill the lubricator with lubricant. The piston 5 can then be moved to the position shown in Fig. 2, and removal of the plug 13 will enable re-filling. Obviously, also, a rapid venting of the air at the air-user side of the valve 22, from the passage 21, space 2ª, and the conduit leading to the air user might be secured by opening the throttle at the latter, or breaking the connection between the lubricator and the air user.

It will be evident that I have provided an improved lubricator, having regulatable, positive, lubricant supply means provided with an automatic control for preventing waste of lubricant when none is required, and having improved refilling arrangements—all in a rugged construction operative in any position the lubricator may assume.

While I have in this application specifically described one form which my invention may assume in practice, it will be understood that this form is shown for purposes of illustration and that the invention may be modified and embodied in various other forms without departing from its spirit or the scope of the appended claims.

What I claim as new and desire to secure by Letters Patent is:

1. In an air line lubricator, a cylinder, a piston therein, said piston having a hollow piston rod extending through an end of the cylinder, said cylinder having a connection for the admission of air thereto at its other end and said piston rod having provision for the delivery of air at its outer end, whereby an air stream may flow from end to end through the lubricator, the space in the cylinder surrounding the piston rod constituting a lubricant reservoir, and means for conducting lubricant from said space to an air stream flowing through said lubricator, said lubricator having associated therewith, in a position to interrupt admission of air to said cylinder, a throttle valve selectively adjustable to permit air flow or to vent the line beyond the same.

2. In a lubricator for pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, conduit means for conducting lubricant from a point near the last-mentioned end of the casing to said passage, and a resiliently positioned valve between the ends of said conduit means for controlling flow through the latter, said valve formed and arranged to preclude the exertion of unbalanced lubricant pressures thereon except transversely of its direction of movement.

3. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, conduit means for conducting lubricant from a point near the last-mentioned end of the casing to said passage, a resiliently positioned valve normally closing said conduit means, and means normally substantially closing said passage and controlling said valve.

4. In a lubricator, means providing a lubricant reservoir, means providing a passage for conducting pressure fluid, means for creating a lubricant pressure in excess of the pressure of the pressure fluid in said passage, means for conducting lubricant at such pressure to said passage, and means for controlling said conducting means including a lubricant flow-rate controlling valve and a lubricant flow interrupting valve, the latter having cam operating means governed by flow in said passage.

5. In a lubricator, means providing a lubricant reservoir, means providing a passage for conducting pressure fluid, means for creating a lubricant pressure in excess of the pressure of the pressure fluid in said passage, means for conducting lubricant at such pressure to said passage, and means for controlling said conducting means including a swinging flap extending transversely of and in one position nearly closing said passage and a valve movable thereby.

6. In a lubricator, means providing a lubricant reservoir, means providing a passage for conducting pressure fluid, means including a piston subjected to the pressure in said passage for creating a lubricant pressure in excess of the pressure of the pressure fluid in said passage, means for conducting lubricant at such pressure to said passage, and means for controlling said conducting means including a swinging flap opposite said passage, a cam moved thereby, and a reciprocable valve movable by said cam.

7. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, a filler opening at said last-mentioned end, a strainer screen interposed between said opening and said reservoir and surrounding said piston rod, and means for conducting lubricant from a point near the last-mentioned end of the casing to said passage.

8. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, means for conducting lubricant from a point near the last-mentioned end of the casing to said passage and having a mouth communicating with the latter, means for regulating the rate of flow through said conducting means including a valve intermediate the ends thereof, and means governed by pressure fluid passing through the casing and also including a valve intermediate the ends of said conducting means, for precluding flow through the latter except when pressure fluid is flowing through said fluid supply connection.

9. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, means for conducting lubricant from a point near the last-mentioned end of the casing to said passage, and means for controlling lubricant flow to said conducting means, said lubricant flow controlling means including a valve for controlling said conducting means and having lubricant passage forming means extending transversely thereof and a pressure fluid actuated operating device for said valve responsive to pressure fluid flow in said passage.

10. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last-mentioned casing end a lubricant reservoir, means for conducting lubricant from a point near the last-mentioned end of the casing to said passage, and means including a lubricant-conducting-means-controlling valve having lubricant passage forming means extending transversely thereof and a pressure fluid actuated cam-type operating device for said valve, for controlling lubricant flow through said conducting means.

11. In an air line lubricator, a cylinder, a piston therein, said piston having a hollow piston rod extending through an end of the cylinder, said cylinder having a connection for the admission of air thereto at its other end, and said piston rod having provision for the delivery of air at its outer end, whereby an air stream may flow from end to end through the lubricator, the space in the cylinder surrounding the piston rod constituting a lubricant reservoir, and means for conducting lubricant from said space to an air stream flowing through said lubricator, said lubricator having in its head which has the air admission connection a throttle valve operative in one position to permit air admission and in another position to vent the air from the lubricator.

12. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last mentioned casing end a lubricant reservoir, conduit means for conducting lubricant from a point near the last mentioned end of the casing to said passage, and a resiliently positioned valve between the ends of said conduit means movable transversely thereof for controlling flow therethrough.

13. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last mentioned casing end a lubricant reservoir, conduit means for conducting lubricant from a point near the last mentioned end of the casing to said passage, a valve in said conduit means between the ends thereof for controlling flow therethrough, and means within said casing for controlling said valve.

14. In a lubricator for a pressure fluid supply line, a casing having at one end a passage constituting a fluid supply connection, within the casing a piston having a hollow piston rod, and at the other end of the casing a bore through which the rod extends, said casing providing between the piston and the last mentioned casing end a lubricant reservoir, conduit means for conducting lubricant from a point near the last mentioned end of the casing to said passage, a valve biased towards closed position disposed between the ends of said conduit for controlling flow therethrough, and means governed by pressure fluid flow through said lubricator for moving said valve to open position.

15. In a lubricator, means providing a lubricant reservoir, means for providing a passage for conducting pressure fluid, means for creating a lubricant pressure in excess of the pressure of the pressure fluid in said passage, means for conducting lubricant at such pressure to said passage, and means for controlling said conducting means including a lubricant flow rate controlling valve and a lubricant flow interrupting valve, the latter movable to open in a direction at an angle to the axis of the pressure fluid conducting passage.

16. In a lubricator for a pressure fluid supply line, a casing having at one end a passage constituting a fluid supply connection, within the casing a piston having a hollow piston rod and at the other end of the casing a bore through which the rod extends, said casing providing between the piston and the last mentioned casing end a lubricant reservoir, means for conducting lubricant from a point near the last mentioned end of the casing to said passage, and means for controlling lubricant flow through said conducting means including a valve having lubricant conducting means extending transversely thereof, and a valve actuating device governed by flow of pressure fluid through the lubricator.

17. In an air line lubricator, a cylinder, a piston therein, said piston having a hollow piston rod extending through an end of the cylinder, said cylinder having a connection for the admission of air thereto at its other end and said piston rod having provision for the delivery of air at its outer end, whereby an air stream may flow from end to end through the lubricator, the space in the cylinder surrounding the piston rod constituting a lubricant reservoir, means for conducting lubricant from said space to an air stream flowing through said lubricator, and valve means for selectively controlling air flow through the lubricator or venting the same at will.

18. In a lubricator for introducing lubricant into a line in which motive fluid flows, a casing, means for dividing the interior thereof into a lubricant reservoir and a motive fluid conducting passage and for creating a pressure differential between the space within the lubricant reservoir and the motive fluid passage within said casing when said passage is under motive fluid pressure, means for delivering lubricant from said lubricant reservoir into said motive fluid passage for entrainment by motive fluid while the latter is passing through said passage, and valve means for selectively controlling motive fluid flow through said passage or venting the same at will.

19. In a lubricator, a cylinder having heads, one formed with a motive fluid supply connection and the other with a bore for receiving a piston rod, a piston reciprocable in said casing and having a piston rod extending through said bore, said piston and piston rod having a bore therethrough extending from the side of the piston nearer said first mentioned head through the opposite end of said piston rod, said casing providing a lubricant reservoir between the side of the piston nearer the second mentioned head and said second mentioned head, means for delivering lubricant from said reservoir to motive fluid passing through said lubricator at a point between the opposite ends of the latter, and valve means for controlling motive fluid admission through said motive fluid supply connection or, alternatively, emptying the lubricator of motive fluid at will.

ELMER G. GARTIN.